United States Patent
Arnold

(10) Patent No.: US 6,526,918 B1
(45) Date of Patent: Mar. 4, 2003

(54) RETRACTING LEASH

(76) Inventor: Gerhard Arnold, Marcobrunnerstrasse 20, D-65197 Wiesbaden (DE)

( * ) Notice: Subject to any disclaimer, the term of this patent is extended or adjusted under 35 U.S.C. 154(b) by 0 days.

(21) Appl. No.: 10/049,685

(22) PCT Filed: Aug. 18, 2000

(86) PCT No.: PCT/DE00/02834
§ 371 (c)(1),
(2), (4) Date: Feb. 15, 2002

(87) PCT Pub. No.: WO01/11948
PCT Pub. Date: Feb. 22, 2001

(30) Foreign Application Priority Data

Aug. 18, 1999 (DE) .......................... 199 38 581
Jul. 21, 2000 (DE) .......................... 100 35 583

(51) Int. Cl.[7] .............................................. A01K 27/00
(52) U.S. Cl. ...................................................... 119/796
(58) Field of Search ................................ 119/769, 792, 119/794–797

(56) References Cited

U.S. PATENT DOCUMENTS

| 3,693,596 A | 9/1972 | Croce | .......................... 119/769 |
|---|---|---|---|
| 3,853,283 A | * 12/1974 | Croce et al. | ................. 119/796 |
| 3,937,418 A | * 2/1976 | Critelli | ......................... 119/796 |
| 4,762,089 A | * 8/1988 | McNulty | ..................... 119/796 |
| 5,377,626 A | * 1/1995 | Kilsby et al. | ................ 119/796 |
| 5,887,550 A | * 3/1999 | Levine et al. | ................ 119/796 |

FOREIGN PATENT DOCUMENTS

| EP | 0 464 725 A1 * | 6/1991 | .......... A01K/27/00 |
|---|---|---|---|
| EP | 0488074 | 6/1992 | ........... H02G/11/02 |

* cited by examiner

Primary Examiner—Charles T. Jordan
Assistant Examiner—Kimberly S. Smith
(74) Attorney, Agent, or Firm—Crowell & Moring LLP

(57) ABSTRACT

A retracting leash which supports, in a housing, a cable drum, which is under tension in the winding up direction and is connected coaxially with a gear wheel and for which a pawl stop, having a stop at the housing, is provided for blocking the gear wheel in one direction of rotation. The pawl stop is formed by a pinion, which meshes with the gear wheel and has a shaft, which is mounted displaceably in a guide of the housing, extending at least approximately coaxially to the axis of rotation of the gear wheel. The pinion or a pawl, connected with the pinion, in an end position of the shaft, lies against a stop at the housing, yet is held freely rotatable when the shaft is shifted in the opposite direction. An element for separating the stop from the pinion, acting counter to the force of a spring, is provided.

7 Claims, 4 Drawing Sheets

RETRACTING LEASH

This invention relates to a retracting leash for dogs, which supports in a housing a cable drum, which is under tension in the winding-up direction and is connected coaxially with a gear wheel and for which a pawl stop, having a stop at the housing, is provided for blocking the rotation of the gear wheel in one direction.

A retracting leash for dogs of the above type is the object of U.S. Pat. No. 3,693,596. For the retracting leash for dogs, described in this publication, two oppositely acting pawl stops are provided, which can be made active alternatively by actuating a lever.

The pawl stops each have a spring-loaded pawl, which reaches the gearing, for which the gear wheel is rotated in one direction and ratchets over the gearing wherein it is rotated in the other direction. It is a disadvantage of such pawl locking mechanism that, in the releasing direction of rotation, the locking pawl ratchets over the gearing and generates relatively much noise, which is highly disturbing for retracting leashes for dogs. Moreover, due to the ratcheting of the locking pawl over the gearing, there is wear of the gear wheel and of the locking pawl. Quite apart from this, in the case of a retracting leash for dogs with a locking pawl, the return spring would have to be relatively strong, in order to be able to overcome the friction of the locking pawl. As a result, the retracting leash for dogs would be undesirably sluggish.

EP 0 488 074 A1 also shows a cable drum for an electric cable, for which the pawl stop has a friction wheel, the shaft of which is held movably in a groove in such a manner that, when the direction of rotation is reversed, the friction wheel automatically reaches a position, in which the cable drum is blocked unless a push button is depressed.

SUMMARY OF THE INVENTION

It is an object of the invention to develop a retracting leash for dogs of the type above, which operates with as little noise and as little friction as possible and is subject to little wear. Furthermore, the possibility of an unintentional unloading of the retracting leash for dogs is to be precluded.

Pursuant to the invention, this object is accomplished owing to the fact that the pawl stop is formed by a pinion, which meshes with the gear wheel and has a shaft, which is mounted displaceably in a guide of the housing, extending at least approximately coaxially to the axis of rotation of the gear wheel, and that the pinion or a pawl, connected with the pinion, in an end position of the shaft, lies against a stop at the housing, yet is held freely rotatable when the shaft is shifted in the opposite direction and that means, acting counter to the force of a spring, are provided for separating the stop and the pinion.

In the case of such a retracting leash for dogs, the pinion cannot rotate freely in one direction of rotation of the gear wheel. It therefore does not cause any noise and does not lead to increased wear. If the direction of rotation is reversed, the shaft of the pinion moves into such a position, that the pawl comes up against the stop at the housing and the gear wheel is blocked reliably by these means. The blocking principle of the previously customary retracting leash for dogs, for which the blocking action is achieved by depressing a pushbutton, is reversed by the invention. If the inventive retracting leash for dogs is held merely at the handle, it is ensured that the leash cannot be unwound from the cable drum. If the dog deliberately is to be granted more space to roam, the slide must be shifted against the force of the spring. Accordingly, the invention ensures that the dog cannot suddenly run off and distance himself from the person holding the inventive leash. In addition, the inventive retracting leash for dogs has the advantage that, for fetching the dog, it is only necessary to move the part, held by hand, repeatedly in the direction of the dog and back. In so doing, the leash is rolled up correspondingly and cannot be unrolled once again unless the push button is depressed.

In a structurally particularly simple embodiment, the stop is provided at a slide, which protrudes partly from the housing and is disposed so that it can be shifted by guides against the force of the spring from a blocking position into a position, in which the pinion is released.

Alternatively, it is, however, also possible that the shaft protrudes out of the guide of the housing, so that it can be shifted manually.

If large forces act on the retracting leash for dogs, a further development of the invention is advantageous, for which there are two gear wheels, which are disposed parallel to one another, and two pinions, which are disposed correspondingly parallel to one another and for which the pinions are connected with one another by a cylinder having a pawl. By these means, space is gained for a pawl, the width of which corresponds to the mutual distance between the gear wheels, and a correspondingly wide stop, so that particularly high forces can be transferred in the blocked position and the pawl does not break off even when it strikes against the stop at a relatively high speed.

The safety function, which prevents an unintentional unrolling of the leash, can be canceled temporarily if a manually operated stopper for blocking the slide, having the stop, is disposed at the housing in a position in which the pinion is released.

The teeth of the pinion and of the two gear wheels are able to withstand particularly high forces if, in accordance with a further development of the invention, the pinions and the gear wheels in each case on one side of their teeth have a disc, which is connected at the front side to the teeth.

BRIEF DESCRIPTION OF THE DRAWINGS

In order to make the invention clear, reference is made in the following to the drawing in which.

DESCRIPTION OF THE PREFERRED EMBODIMENTS

Figure 1:
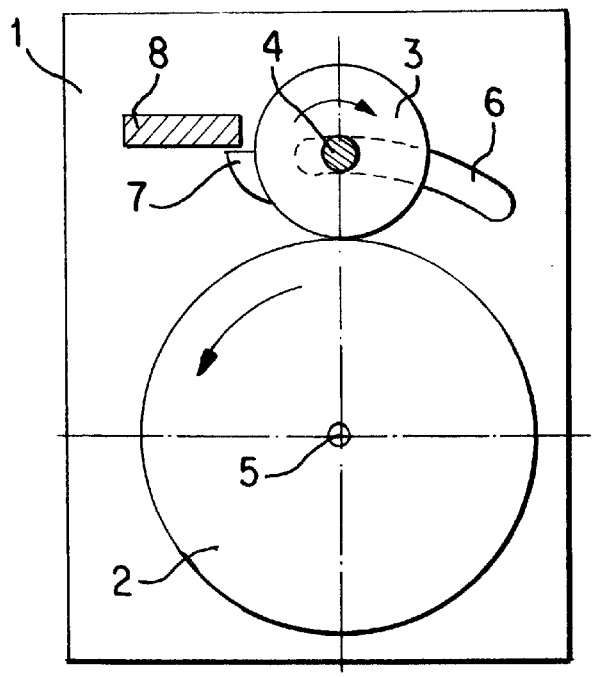
FIG. 1 is a diagrammatic side view of the inventive gear unit.

FIG. 1 shows a housing 1, which supports a gear wheel 2 and a pinion 3, which meshes with the gear wheel 2. The pinion 3 has a shaft 4, which is disposed movably in a guide to 6, which extends coaxially with the axis of rotation 5 of the gear wheel 2. The pinion 3 is connected non-rotationally with a pawl 7, which, in the position of the shaft 4 shown, is able to come up against a stop 8.

If the gear wheel 2 is turned clockwise, then the shaft 4 migrates in the guide 6 to the right, as seen in FIG. 1, so that the pawl 7 no longer is able to reach the stop 8. As soon as the gear wheel 2 is turned once again in the opposite direction, the pinion resumes the position shown, in which it and, with that, the gear wheel 2, is blocked.

Figure 2:
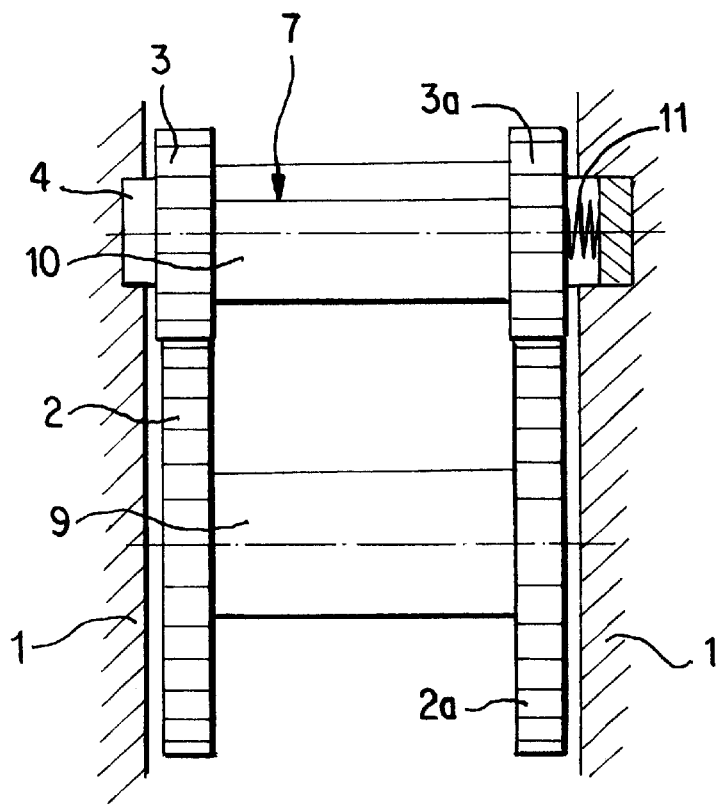
FIG. 2 is a section through the gear unit of FIG. 1.

FIG. 2 shows that two gear wheels 2, 2a, can form side parts of a cable drum 9. The cable drum 9 is under tension in a winding up direction Correspondingly, two pinions 3, 3a are provided for this embodiment. The pawl of FIG. 2 is provided at a cylinder 10 between the pinions 3, 3a. A spring 11 ensures that the pinion 3, 3a is not rotated too easily, so that a shifting of the shaft 4 in the guide 6, shown in FIG. 1, is ensured.

Figure 3:
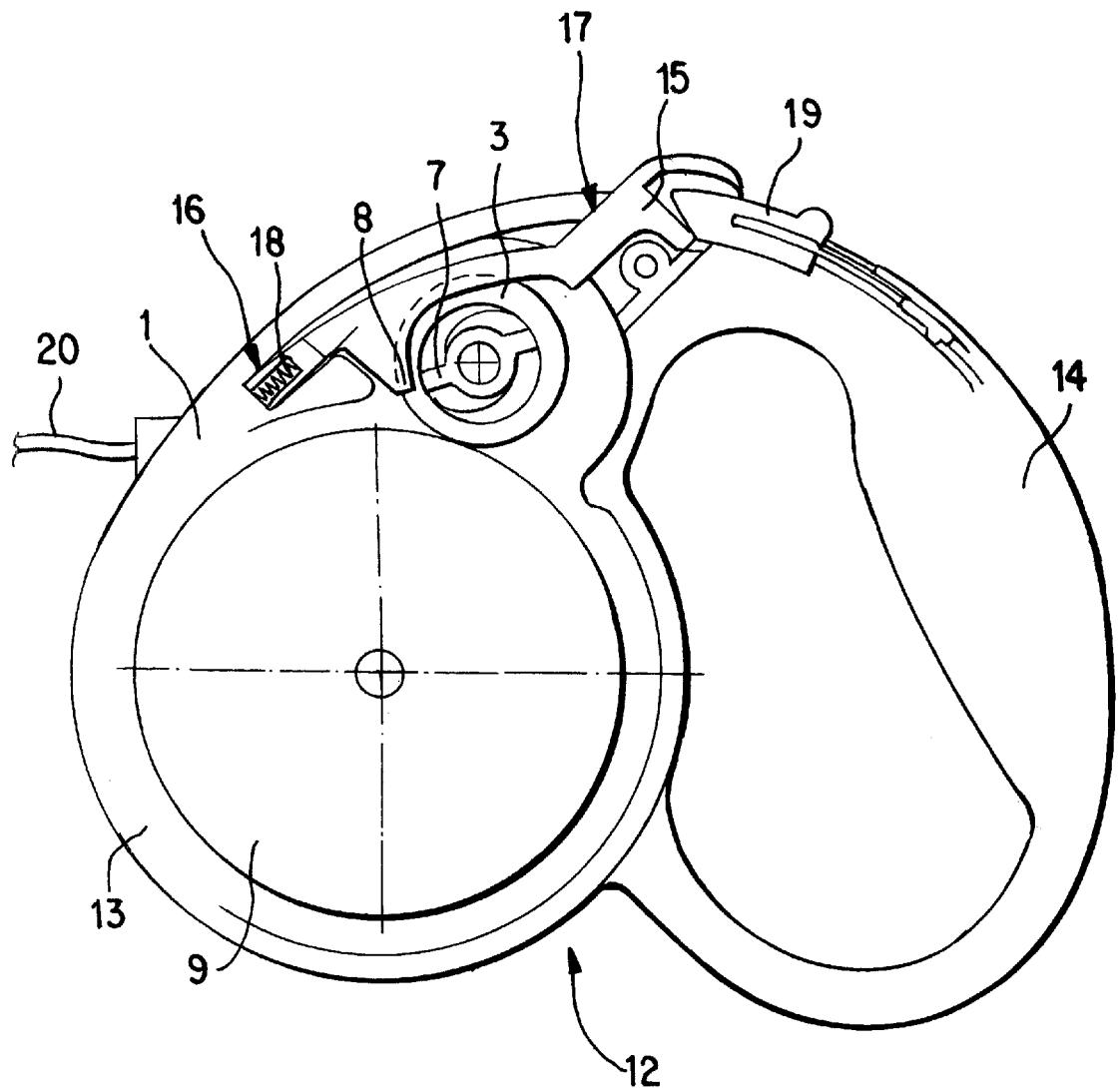
FIG. 3 is a diagrammatic side view of a retracting leash for dogs with the inventive gear unit, individual parts of the interior of the gear unit being visible.

FIG. 3 shows a retracting leash for dogs 12, for which the housing 1 has a gear unit space 13 with the cable drum 9 and the pinion 3. On the outside of the housing 1, a handle 14 is integrally molded. An end region of a slide 15, which has the stop 8, protrudes from the housing 1. In the position shown, this stop 8 is outside of the flight circle of the pawl 7 of the pinion 3.

Guides 16, 17 enable the slide 15 to move by a fixed amount obliquely upward out of the housing 1, as a result of which the stop 8 reaches the path of movement of the pawl 7. A spring 18 holds the slide 15 in the blocking position, which is not shown. In the position shown, the slide 15 is prevented from moving further to the outside by a stopper 19, which is provided at the outside of the housing 1, and can be shifted manually to engage the slide 15.

A partial region of a leash 20, to the free end of which a dog is attached, is also shown in FIG. 3. In the position of the slide 15 shown, the cable drum 9 can rotate freely in both directions, so that the dog is free to run up to a distance, corresponding to the length of the leash.

If the stopper 19 is pushed back, the slide 15 is shifted obliquely upward by the spring 18, as a result of which the stop 8 enters t he path of movement of the pawl 7. Consequently, the leash no longer can be unrolled. If the dog is to be given more space in which to roam, the slide 15 must be pressed manually into the position shown. However, since the pinion, as shown diagrammatically in FIG. 1, can be moved in the guide 6, it moves away from the stop 8 when the leash 20 is roll ed up, so that the cable drum 9 can be rolled up independently of the position of the slide 15.

Figure 4:
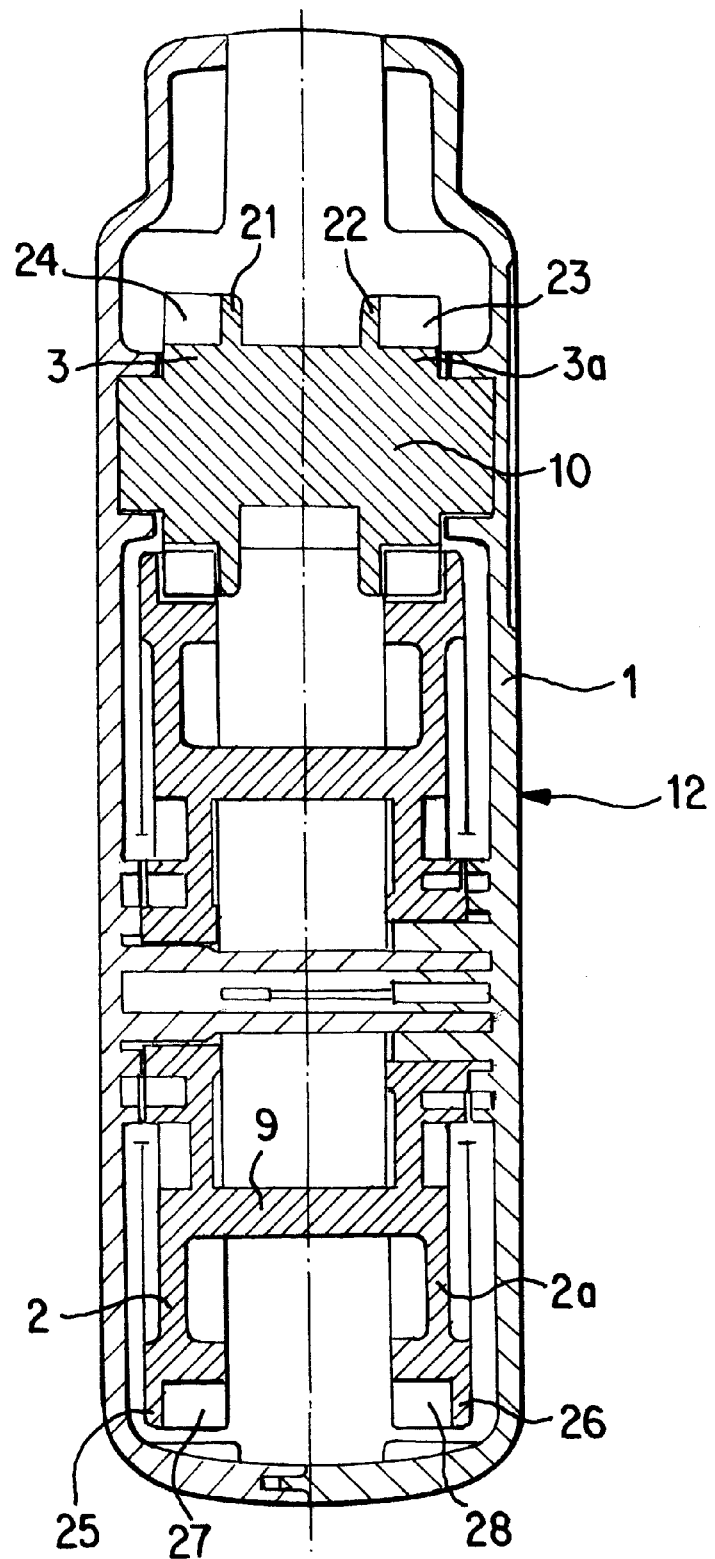
FIG. 4 is a vertical section through the retracting leash for dogs.

FIG. 4 shows how the retracting leash 12 for dogs, the cable drum 9 with the two gear wheels 2, 2a and the cylinder 10 with the two pinions 3, 3a, are supported in the housing 1. It can be seen that the cylinder 10 has two flange-like disks 21, 22, to the outside of which teeth 23, 24, of the pinion 3, 3a, are integrally molded. Correspondingly, the gear wheels 2, 2a, have disks 25, 26, to the inside of which teeth 27, 28, are integrally molded. These disks 21, 22, 25, 26, increase the strength of the teeth 23, 24, 27, 28.

Figure 5:
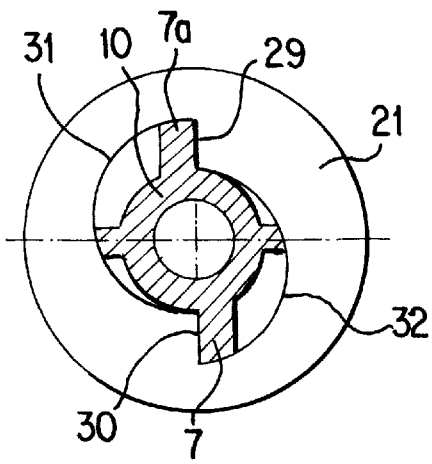
FIG. 5 is a cross-section through a pinion of the gear unit.

The sectional representation of FIG. 5 shows that the cylinder 10 has two diametrically opposite pawls 7, 7a, which extend radially to the outside. At one side, these pawls 7, 7a, in each case have a steep flank 29, 30 while, on the other side, a ramp 31, 32, rising uniformly, leads to the radially outermost end of the pawl 7, 7a. By these means, it is ensured that the pawls 7, 7a, are held by the stop 8 during clockwise rotations, but are forced away from the stop 8 during rotations in the opposite direction.

Figure 6:
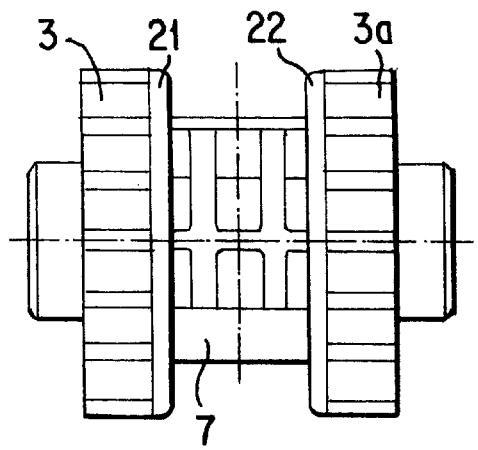
FIG. 6 is a side view of the pinion and FIG. 7 is a longitudinal section through the pinion.
Figure 7:
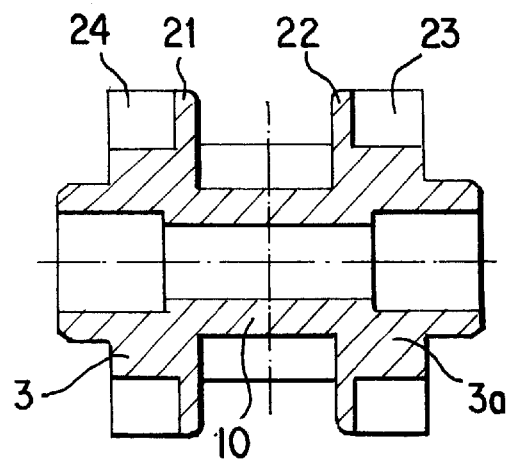

FIGS. 6 and 7 additionally illustrate the configuration of the cylinder 10 with the two pinions 3, 3a, the disks 21, 22 and the teeth 23, 24.

What is claimed is:

1. A retracting leash comprising a housing supporting a cable drum which is under tension in a winding up direction and is connected coaxially with a gear wheel having an axis of rotation, a pawl stop having a stop at the housing adapted to block the gear wheel in one direction of rotation, the pawl stop being formed by a pinion which meshes with the gear wheel and is mounted on a shaft which is mounted displaceably in a guide of the housing extending at least approximately coaxially to the axis of rotation of the gear wheel, and the pinion, or a pawl connected with the pinion, in an end position of the shaft lies against the stop at the housing yet is held freely rotatable when the shaft is shifted in the opposite direction, and means for separating the stop from the pinion acting counter to the force of a spring.

2. The retracting leash of claim 1, wherein the stop is provided at a slide which protrudes partly from the housing and is disposed so that it can be shifted by guides against the force of the spring from a block position into a position in which the pinion is released.

3. The retracting leash of claim 2, wherein, at the housing a stopper which can be actuated manually, is disposed for blocking the slide having the stop in a position in which the pinion is released.

4. The retracting leash of claim 1, wherein the shaft protrudes from the guide of the housing so that it can be shifted manually.

5. The retracting leash of claim 1, wherein the retracting leash for dogs has two gear wheels which are disposed parallel to one another, and correspondingly two pinions which are disposed parallel to one another, and the pinions are connected with one another by a cylinder having the pawl.

6. The retracting leash of claim 5, wherein the pinions and the gear wheels in each case on one side of their teeth have a disc which is connected at one side thereof to the teeth.

7. The retracting leash of claim 1, wherein the pinion, or the two pinions, is mounted so that its rotatability is inhibited slightly by a spring.

* * * * *